United States Patent [19]

Schwartz

[11] 3,852,724

[45] Dec. 3, 1974

[54] SURFACE WAVE CLOCK AND SERIAL DATA STORAGE UNIT

[75] Inventor: Robert J. Schwartz, Houston, Tex.

[73] Assignee: Texas Instruments Incorporated, Dallas, Tex.

[22] Filed: Mar. 30, 1973

[21] Appl. No.: 346,517

[52] U.S. Cl. ....... 340/173 RC, 333/30 R, 340/173 R

[51] Int. Cl. .......................................... G11c 21/00

[58] Field of Search... 340/173 MS, 173 RC, 173 R; 307/221 R; 333/30 R

[56] References Cited

UNITED STATES PATENTS

| | | | |
|---|---|---|---|
| 3,153,776 | 10/1964 | Schwartz | 340/173 RC |
| 3,274,566 | 9/1966 | McGrogan | 340/173 RC |
| 3,668,662 | 6/1972 | Zimmerman et al. | 340/173 RC |
| 3,701,147 | 10/1972 | Whitehouse | 340/173 RC |

*Primary Examiner*—Stuart N. Hecker

*Attorney, Agent, or Firm*—Harold Levine; Rene' Grossman; Thomas G. Devine

[57] ABSTRACT

A surface wave serial data storage unit has a number of parallel surface wave delay lines deposited simultaneously on a common substrate. One of the surface wave delay lines is fabricated as a clock pulse generator. The clock pulse generator surface wave delay line has a plurality of clock line electrodes uniformly distributed on the surface wave delay line electrically isolated from the driver and receiver electrodes. The initial pulse received by the receiver electrodes propagates down the clock generator surface wave delay line and each time it reaches a clock line electrode a clock pulse is generated.

8 Claims, 3 Drawing Figures

SURFACE WAVE CLOCK AND SERIAL DATA STORAGE UNIT

This invention is directed to a serial digital data storage unit and more particularly to a serial digital data storage unit using surface wave devices.

Digital data can be stored in serial form in surface wave devices. However, there is a problem in exact addressing of data in such serial data storage systems because of the problems of clocking data in and out of such serial data storage systems.

It is therefore an object of this invention to provide a new and improved serial digital data storage unit. It is another object of this invention to provide a new and improved serial data storage unit using surface wave devices. It is still another object of this invention to provide a serial surface wave data storage unit having accurate clock pulsing and addressing.

For a more complete understanding of the invention and further objects and advantages thereof, reference may now be had to the following description taken in conjunction with the drawings, wherein FIG. 1 shows a surface wave serial data storage unit;

Figure 1:
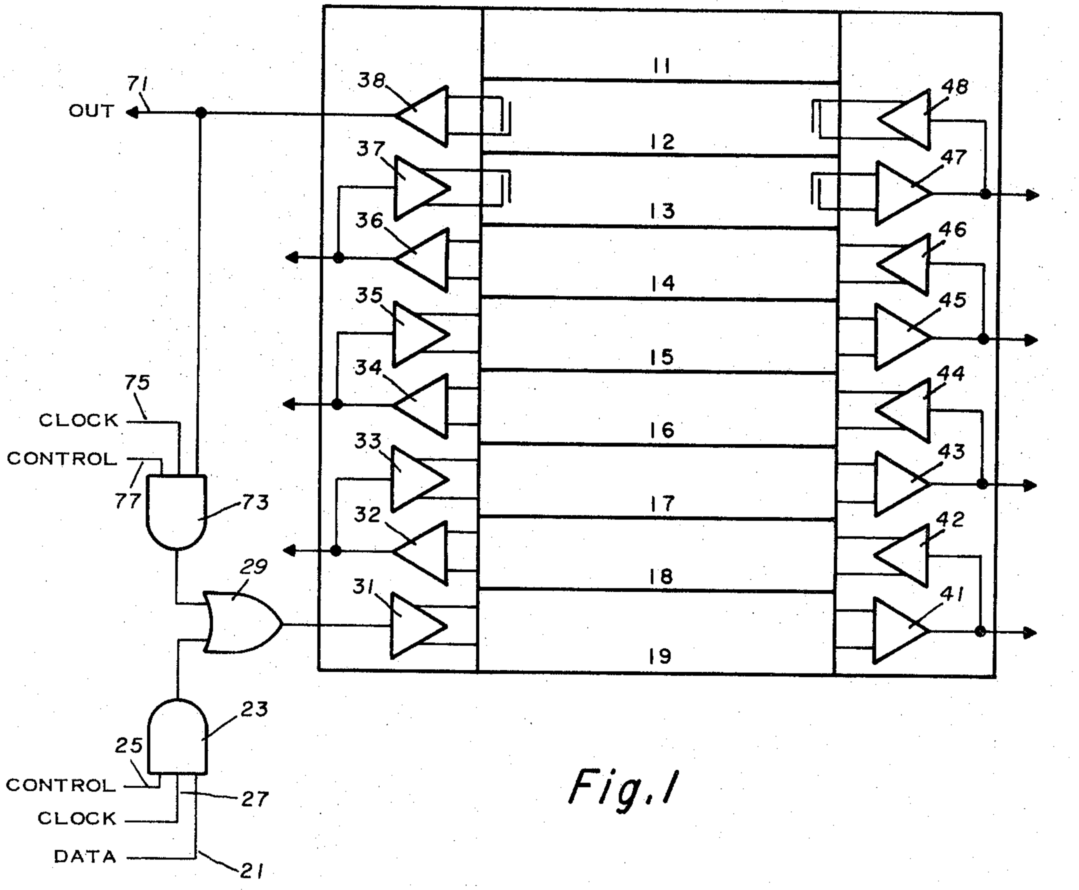

Referring now to FIG. 1, nine surface wave delay lines 11–19 are shown. These nine parallel surface wave delay lines 11–19 are fabricated simultaneously on a common substrate in a manner known in the art. Thus, any variations due to temperature and the like will affect all nine delay lines in a like manner so that there is stability between all delay lines and the propagation delay from the drive electrode to the receiver electrode of all lines remains constant.

Surface wave delay line 11 is the clock generation line and will be described in more detail with reference to FIG. 2. Delay lines 12–19 are connected together to make one long delay line from surface wave delay line 19 to surface wave delay line 12. For the purposes of this description, assume that the delay for each surface wave delay line 11–19 shown is 10.24 microseconds Referring again to FIG. 1, the data is inputted on input terminal 21 to AND circuit 23. A control signal is applied on input terminal 25 and the clock pulse is inputted on terminal 27. The output from AND circuit 23 is connected through an OR circuit 29. The output from OR circuit 29 with the data thereon clocked in by a clock pulse and controlled by a control signal is supplied through a driver 31 and propagated down the surface wave delay unit 19. The data signal is received by receiver circuit 41 and applied to a driver circuit 42 applying the pulse to the next surface wave delay line 18. The other receiver and driver circuits 32–38 and 43–48 connect the surface wave delay lines 12–19 together into one recirculating register. With a delay of 10.24 microseconds for binary data purposes, each surface wave delay line will store 1,024 binary bits and thus the eight surface wave delay lines connected together will store 8,192 binary bits.

The output from receiver 38 on output terminal 71 is the digital output from the surface wave serial data storage unit. To recirculate data in the storage unit, the data output is applied to AND circuit 73. This data is clocked back into the storage unit under control of control line 77 and clock pulses on clock pulse line 75. Alternatively, the data may be read out.

Figure 2:
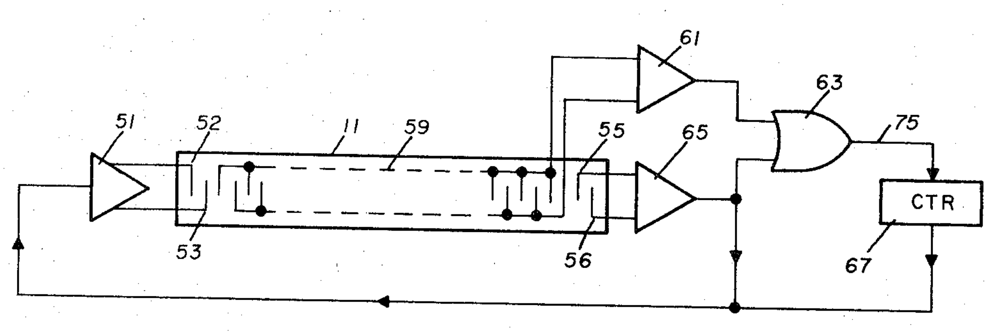
FIG. 2 shows the detail of the clock pulse generator for the serial storage unit.

FIG. 2 shows the clock line surface wave delay line 11 in detail. The clock generation line is fabricated in a different manner from the storage units 12–19 to provide accurate clock pulse generation for the surface wave serial data storage unit. The clock generation line 11 has a driver 51 which applies a pulse to the initial electrodes 52 and 53 in the clock generation line 11. Application of a pulse to the initial electrodes 52 and 53 in the surface wave delay line 11 initiates a propagation of an acoustic pulse in the surface wave delay line 11. As previously described, surface wave delay line 11 has a 10.24 microsecond delay cycle so that the initial pulse applied to electrodes 52 and 53 will be received at electrodes 55 and 56 10.24 microseconds later. The clock generation surface wave line 11 differs from the data storage lines in that an additional 1,023 uniformly distributed electrodes are fabricated on the clock generation line 11. These clock line electrodes are shown generally as numeral 59 in FIG. 2. These clock line electrodes, although electrically connected to each other, are not electrically connected to the receiver and driver electrodes. These clock line electrodes 59 are uniformly distributed over the surface wave delay line 11 so that when the initial pulse is received and propagated down the delay line each time it reaches one of the 1,023 electrodes a pulse will be generated at the receiver circuit 61 and applied to the OR gate 63. Thus, as the acoustic surface wave propagates down the delay line 11 it will in turn be received by the uniformly distributed electrodes so that a stream of uniformly distributed clock pulses will be generated. As the initial pulse propagates down the delay line 11 each time it meets an electrode it will produce a clock pulse at an even interval to produce 1,023 clock pulses. When the initial pulse from electrodes 52 and 53 propagates completely down the delay line 11 it is received by the receiver electrodes 55 and 56, and by receiver circuit 65, to be applied through the OR circuit 63 with the other clock pulses to a counter circuit 67. Counter circuit 67 counts the number of clock pulses received and becomes an address counter to address the address of data stored in data storage lines 12–19 in a manner well known in serial data storage units. The output from the receiver circuit 65 is applied as a reset pulse to counter 67 to reset counter 67. The output from receiver circuit 65 is also recirculated back to driver circuit 51 to again initiate a propagation of a pulse down the surface wave delay line generating the clock pulses as previously described.

Figure 3:
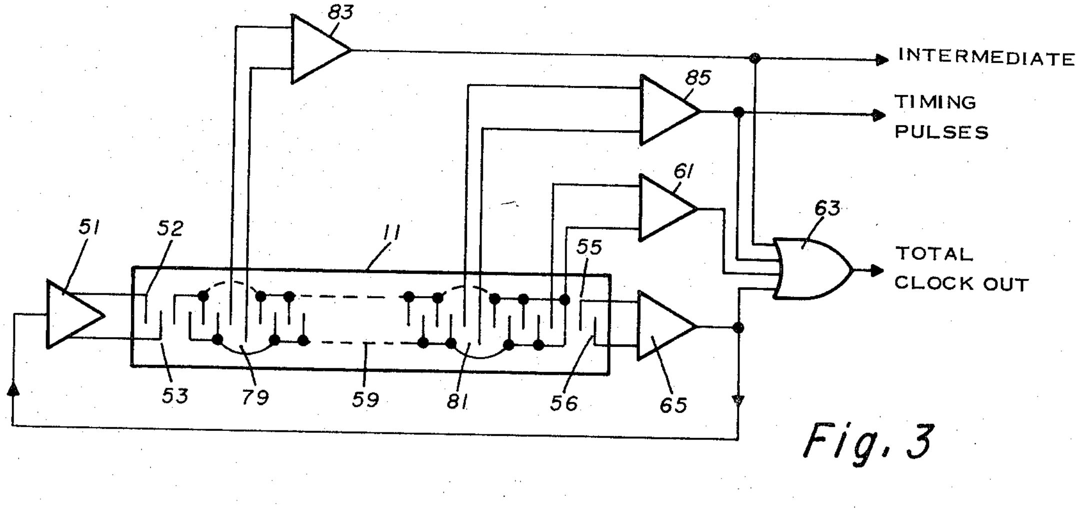
FIG. 3 shows another construction of a clock pulse generator for the serial storage unit.

FIG. 3 shows a modification to the clock line surface wave unit to enable intermediate timing pulses to be generated while also generating full bit clock pulses. Intermediate electrode pairs 79 and 81 are fabricated at predetermined locations on the surface wave delay line. The electrode pairs 79 and 81 are not electrically connected to electrodes 59. Receiver circuits 83 and 85 are connected to the intermediate electrodes 79 and 81 to receive the intermediate clock pulses as the acoustic pulse propagates down the surface wave device 11. These intermediate clock pulses are also applied to OR circuit 63 to provide for the total clock pulse rate.

Referring to FIG. 1, the arrows shown at the output of receiver circuits 32, 34, 36, 41, 43, 45, and 47 represent outputs at which intermediate signal delays may be accessed.

While not shown, it is within the scope of this invention that each surface wave delay line receiver circuit could be coupled to its driver circuit by a separate control circuit similar to that shown in FIG. 1 so that each surface wave storage delay line can function simultaneously and independently of the other surface wave storage delay lines.

What is claimed is:

1. A digital, serial data storage unit formed on a common substrate comprising:

a. a surface wave clock circuit having a driver and driver electrodes and a receiver and receiver electrodes, and further including clock electrodes positioned between and electrically isolated from the driver and receiver electrodes, the spacing between each of the electrodes determining the propagation delay therebetween;

b. at least one surface wave device having a driver and driver electrodes, and a receiver and receiver electrodes, with a predetermined propagation delay between the driver and receiver electrodes;

c. means for applying an initial pulse to the surface wave clock;

d. clock transmission means connected to transmit a propagated clock pulse from the electrodes in the surface wave clock circuit; and e. input means having first gate means for receiving the serial digital data and connected to the transmission means, to permit entry of the data when a clock pulse is present.

2. The storage unit of claim 1 wherein the surface wave clock circuit further comprises output means connected to the means for applying an initial pulse to the surface wave clock.

3. The storage unit of claim 2 wherein the input means further comprise second gate means having an input connected to the output means of the surface wave clock and having an input connected to the output of the receiver of the surface wave device, operatively connected to pass the output from the receiver in the presence of a clock pulse, when the first gate is inoperative.

4. The storage unit of claim 3 wherein there is a plurality of surface wave devices, all parallel to each other and to the surface wave clock circuit, each having a driver and driver electrodes and a receiver and receiver electrodes, the spacing between the driver and receiver electrodes being identical for all of the plurality of surface wave devices, the plurality of surface wave devices being connected in parallel.

5. The storage unit of claim 4 wherein the surface wave clock circuit between the driver and the receiver electrodes is identical dimensionally with the plurality of surface wave devices, wherein the clock electrodes are spaced to provide a wave propagation time equal to the period of one bit of digital data.

6. The storage unit of claim 5 wherein the output means of the surface wave clock circuit further comprises an OR circuit having an input from the output of the receiver of the surface wave clock and from the clock electrodes.

7. The storage unit of claim 6 wherein the output from the OR circuit serves as an input to a digital counter, the counter thereby providing the address of each bit of digital data in each of the plurality of surface wave devices.

8. The storage unit of claim 7 wherein the surface wave clock circuit further includes receivers for providing pulses at predetermined intermediate points.

* * * * *